US009776741B1

(12) United States Patent
Guo et al.

(10) Patent No.: US 9,776,741 B1
(45) Date of Patent: Oct. 3, 2017

(54) METHOD FOR REFINED ATTITUDE CONTROL BASED ON OUTPUT FEEDBACK FOR FLEXIBLE SPACECRAFT

(71) Applicant: Beihang University, Beijing (CN)

(72) Inventors: Lei Guo, Beijing (CN); Jianzhong Qiao, Beijing (CN); Ran Zhang, Beijing (CN); Peixi Zhang, Beijing (CN); Dafa Zhang, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 0 days.

(21) Appl. No.: 15/371,579

(22) Filed: Dec. 7, 2016

(30) Foreign Application Priority Data

Jun. 2, 2016 (CN) .......................... 2016 1 0389633

(51) Int. Cl.
*B64G 1/24* (2006.01)
*G05D 1/08* (2006.01)
*G06F 17/16* (2006.01)

(52) U.S. Cl.
CPC ............. *B64G 1/24* (2013.01); *G05D 1/0883* (2013.01); *G06F 17/16* (2013.01); *B64G 2001/245* (2013.01)

(58) Field of Classification Search
CPC .. B64G 1/24; B64G 2001/245; G05D 1/0833; G06F 17/16
See application file for complete search history.

(56) References Cited

U.S. PATENT DOCUMENTS 6,463,365 B1 * 10/2002 Anagnost et al. ..... B64G 1/281
244/164
8,380,473 B2 * 2/2013 Falangas ............. G06F 17/5095
701/4

(Continued)

OTHER PUBLICATIONS

Liu et al., "Robust Time-Optimal Control of Uncertain Flexible Spacecraft", Journal of Guidance, Control, and Dynamics, vol. 15, No. 3 (1992), pp. 597-604.*

(Continued)

*Primary Examiner* — Todd Melton
(74) *Attorney, Agent, or Firm* — Locke Lord LLP; Tim Tingkang Xia, Esq.

(57) ABSTRACT

The present invention provides a method for refined attitude control based on output feedback for a flexible spacecraft. The control method comprises the following steps of: a) building a flexible spacecraft dynamical system $\Sigma_1$, converting the flexible spacecraft dynamical system $\Sigma_1$ into a flexible spacecraft dynamical system $\Sigma_2$, and incorporating spacecraft rigid-flexible coupling dynamic disturbance into the flexible spacecraft dynamical system $\Sigma_2$; b) constructing an external system $\Sigma_3$, and describing the rigid-flexible coupling dynamic disturbance through the external system $\Sigma_3$; c) configuring a disturbance observer for estimating the value of the rigid-flexible coupling dynamic disturbance; d) configuring a dynamic output feedback $H_\infty$ controller; e) compounding the disturbance observer in step c) with the dynamic output feedback $H_\infty$ controller in step d) to obtain a flexible spacecraft refined attitude control system $\Sigma_6$; the flexible spacecraft refined attitude control system $\Sigma_6$ compensating for the rigid-flexible coupling dynamic disturbance through the estimated value.

8 Claims, 2 Drawing Sheets

(56) References Cited

U.S. PATENT DOCUMENTS

2008/0315039 A1* 12/2008 Rudd et al. .............. B64G 1/24
 244/164
2016/0194095 A1* 7/2016 Weiss et al. ............. B64G 1/26
 701/13

OTHER PUBLICATIONS

Luo et al., "H-Infinity Inverse Optimal Attitude-Tracking Control of Rigid Spacecraft", Journal of Guidance, Control, and Dynamics, vol. 28, No. 3 (2005), pp. 481-494.*
Zhang et al., "Disturbance Observer Based H∞ Control for Flexible Spacecraft with Time-Varying Input Delay", Advances in Difference Equations 2013:142, May 2013, pp. 1-12.*

* cited by examiner

METHOD FOR REFINED ATTITUDE CONTROL BASED ON OUTPUT FEEDBACK FOR FLEXIBLE SPACECRAFT

CROSS-REFERENCE TO RELATED APPLICATIONS

This non-provisional application claims priority to and benefit of, under 35 U.S.C. §119(a), Patent Application No. 201610389633.5 filed in P.R. China on Jun. 2, 2016, the entire content of which is hereby incorporated by reference.

FIELD OF THE INVENTION

The present invention relates to the field of aerospace technology, and in particular, to a method for refined attitude control based on output feedback for a flexible spacecraft.

BACKGROUND OF THE INVENTION

With the development of aerospace technology, more and more spacecrafts carry large flexible mechanisms such as solar panels and antennas, and these flexible mechanisms make the functions of the spacecrafts stronger and stronger, but meanwhile bring along a challenge for the attitude control of the spacecrafts, especially when the spacecrafts have a high requirement for control accuracy, for example earth observation satellites, space telescopes and so on. Therefore, a flexible spacecraft will not only suffer from external environmental disturbance, but also suffer from severe influence from rigid-flexible coupling dynamics when it operates in the space. With regards to such complicated problems, many scholars have proposed corresponding control methods, among which $H_\infty$ control, sliding-mode structure control and the like are very common. However, $H_\infty$ control is a typical disturbance suppression method, and it considers all disturbances as single norm-bounded disturbances, thus resulting in a low control accuracy. While the sliding-mode structure control has advantages such as robustness, rapidity and so on, but its control rate is generally very complicated, and has chattering phenomenon, and thus is not beneficial to practical industrial application. Moreover, most of the attitude control methods currently design a controller by assuming that all states of the system are measurable. However, it is difficult to satisfy the above assumption in the practical aerospace engineering, for example, in a case where some of the measurement sensors are faulted. Further, due to the reasons such as the cost of measurement of angular velocity and the like, more and more scholars begin to study the attitude control issue without the measurement of angular velocity, which actually is also an attitude control issue based output feedback. Therefore, it has theoretically and practically meaningful to design an attitude controller with high accuracy based on output feedback. The early work also involves estimating the disturbance caused by rigid-flexible coupling by using DOBC, but the premise is that all state variables of the system are assumed to be measurable, and the change rate of the disturbance is bounded.

Control based on a disturbance observer (DOBC) makes full use of the characteristic of disturbance, and achieves high-accuracy estimation and compensation of disturbance, and can be easily combined with other control methods. Therefore, a refined compound attitude controller can be configured based on a disturbance observer to realize both compensation and suppression of disturbance, thereby improving the attitude control accuracy of a flexible spacecraft.

Accordingly, there is a need for a method for refined attitude control based on output feedback for a flexible spacecraft that can efficiently compensate for the rigid-flexible coupling disturbance and suppress external environmental disturbance.

SUMMARY OF THE INVENTION

An objective of the present invention is to provide a method for refined attitude control based on output feedback for a flexible spacecraft. The method comprises the following steps of:

a) building a flexible spacecraft dynamical system $\Sigma_1$, converting the flexible spacecraft dynamical system $\Sigma_1$ into a flexible spacecraft dynamical system $\Sigma_2$, and incorporating spacecraft rigid-flexible coupling dynamic disturbance into the flexible spacecraft dynamical system $\Sigma_2$;

b) constructing an external system $\Sigma_3$, and describing the rigid-flexible coupling dynamic disturbance through the external system $\Sigma_3$; the rigid-flexible coupling dynamic disturbance $d_0$ is expressed as $d_0 = F(C_d\dot\eta + \Lambda\eta)$, in which F is a rigid-flexible coupling matrix of a flexible appendage and a body, $C_d$ is a modal damping matrix, $\Lambda$ is a rigidity matrix, $\eta$ is a mode of the flexible appendage, and $\dot\eta$ is a derivative of the mode $\eta$ of the flexible appendage;

the external system $\Sigma_3$ describing the rigid-flexible coupling dynamic disturbance $d_0$ as:

$$\Sigma_3 : \begin{cases} \dot w = Ww + H(u + d_1) \\ d_0 = Vw \end{cases}$$

in which, $w = [\eta^T \dot\eta^T]^T$, $W = \begin{bmatrix} 0 & I \\ -M^{-1}\Lambda & -M^{-1}C_d \end{bmatrix}$, $$H = \begin{bmatrix} 0 \\ -\frac{1}{J}M^{-1}F^T \end{bmatrix}, V = [F\Lambda \quad FC_d]$$

w is a disturbance state variable of the external system $\Sigma_3$, $\dot w$ is a derivative of w, W, H and V are defined coefficient matrixes, and I is a unit matrix;

c) configuring a disturbance observer for estimating a value of the rigid-flexible coupling dynamic disturbance;

d) configuring a dynamic output feedback $H_\infty$ controller;

e) compounding the disturbance observer in step c) with the dynamic output feedback $H_\infty$ controller in step d) to obtain a flexible spacecraft refined attitude control system $\Sigma_6$ the flexible spacecraft refined attitude control system $\Sigma_6$ is used to compensate for the rigid-flexible coupling dynamic disturbance through the estimated value.

Preferably, the flexible spacecraft dynamical system $\Sigma_1$ is expressed as:

$$\Sigma_1 : \begin{cases} J\ddot\theta + F\ddot\eta = u + d_1 \\ \ddot\eta + C_d\dot\eta + \Lambda\eta + F^T\ddot\theta = 0 \end{cases}$$

wherein, $\theta$ is a spacecraft attitude angle, $\ddot\theta$ is a second-order derivative of the spacecraft attitude angle $\theta$, J is a spacecraft rotational inertia, F is the rigid-flexible coupling matrix of the flexible appendage and the body, $F^T$ is a transposed matrix of the rigid-flexible coupling matrix, u is control input, $d_1$ is environmental disturbance torque, $\eta$ is the mode of the flexible appendage, $\dot{\eta}$ is the derivative of the mode $\eta$ of the flexible appendage, $\ddot{\eta}$ is a second-order derivative of the mode $\eta$ of the flexible appendage, $C_d$ is the modal damping matrix, and $\Lambda$ is the rigidity matrix.

Preferably, the modal damping matrix $C_d$ is expressed as $C_d = \text{diag}\{2\zeta_i \omega_i\}$ (i=1, 2, ... N), in which N is a number of orders of the mode, $\zeta_i$ is modal damping, $\omega_i$ is a modal frequency, and the rigidity matrix $\Lambda$ is expressed as $\Lambda = \text{diag}\{\omega_i^2\}$ (i=1, 2, ... N).

Preferably, the system $\Sigma_2$ is expressed as:

$$\Sigma_2: (J - FF^T)\ddot{\theta} = F(C_d \dot{\eta} + \Lambda \eta) + u + d_1$$

wherein, $\ddot{\theta}$ is the second-order derivative of the spacecraft attitude angle $\theta$, J is the spacecraft rotational inertia, F is the rigid-flexible coupling matrix of the flexible appendage and the body, $F^T$ is the transposed matrix of the rigid-flexible coupling matrix, u is the control input, $d_1$ is the environmental disturbance torque, $\eta$ is the mode of the flexible appendage, $\dot{\eta}$ is the derivative of the mode $\eta$ of the flexible appendage, $C_d$ is the modal damping matrix, and $\Lambda$ is the rigidity matrix.

Preferably, in the coefficient matrix W, the matrix M is expressed as $M = I - F^T J^{-1} F$, in which I is the unit matrix.

Preferably, the disturbance observer in the step c) is configured in the following steps:

(1) constructing a spacecraft attitude angle input matrix $$x = [\theta \quad \dot{\theta}]^T;$$

(2) converting the system $\Sigma_2$ into a state space system $\Sigma_1$, which is expressed as:

$$\Sigma_4: \begin{cases} \dot{x} = Ax + B(u + d_0 + d_1) \\ y = Cx \end{cases}$$

wherein, $$A = \begin{bmatrix} 0 & 1 \\ 0 & 0 \end{bmatrix}, B = \begin{bmatrix} 0 \\ (J - FF^T)^{-1} \end{bmatrix},$$

A and B are coefficient matrixes, y is a measurement output, and C is a measurement matrix;

(3) configuring the disturbance observer with the aid of the measurement output y, the disturbance observer being expressed as:

$$\begin{cases} \hat{d}_0 = V\hat{w} \\ \hat{w} = v - Ly \\ \dot{v} = (W + LVBV)\hat{w} + (H + LCB)u \end{cases}$$

wherein, $\hat{d}_0$ is an estimated value of the rigid-flexible coupling dynamic disturbance $d_0$, v is an auxiliary variable, $\dot{v}$ is a derivative of the auxiliary variable v, y is the measurement output, and L is a disturbance observer gain matrix;

observation error dynamic $\Sigma_5$ of the disturbance controller is expressed as:

$$\Sigma_5: \dot{e}_w = (W + LCBV)e_w + LVAx + (LVB + H)d_1$$

wherein, $e_w = w - \hat{w}$, $\hat{w}$ is an estimated value of the disturbance state variable w, and $\dot{e}_w$ is a derivative of $e_w$.

Preferably, the dynamic output feedback $H_\infty$ controller in the step d) is expressed as:

$$\begin{cases} \dot{x}_k = A_k x_k + B_k y \\ u_1 = C_k x_k + D_k y \end{cases}$$

wherein, $u_1$ is input of the dynamic output feedback $H_\infty$ controller, $x_k$ is a controller state, $A_x$, $B_x$, $C_x$ and $D_x$ are controller parameter matrixes to be determined, and the dynamic output feedback $H_\infty$ controller suppresses environmental disturbance.

Preferably, the flexible spacecraft refined attitude control system $\Sigma_6$ in the step e) is expressed as:

$$\Sigma_6: \begin{cases} \dot{x}_k = A_k x_k + B_k y \\ u = C_k x_k + D_k y - \hat{d} \end{cases}$$

wherein u is the control input, and $\hat{d}_0$ is the value of the rigid-flexible coupling dynamic disturbance $d_0$ estimated by the disturbance observer.

Preferably, the disturbance controller gain matrix L and the controller parameter matrixes $A_x$, $B_x$, $C_x$, $D_x$ to be determined are solved through a convex optimization algorithm as below:

making the systems $\Sigma_4$, $\Sigma_5$ and $\Sigma_6$ simultaneous, and obtaining:

$$\begin{bmatrix} \dot{x} \\ \dot{x}_k \\ \dot{e}_w \end{bmatrix} = \begin{bmatrix} A + BD_k C & BC_k & BV \\ B_k C & A_k & 0 \\ LCA & 0 & W + LCBV \end{bmatrix} \begin{bmatrix} x \\ x_k \\ e_w \end{bmatrix} + \begin{bmatrix} B \\ 0 \\ LCB + H \end{bmatrix} d_1$$

solving the following convex optimization problem:

$$\begin{bmatrix} \Phi_{11} & \Phi_{12} & \Phi_{13} & \Phi_{14} & \Phi_{15} & \Phi_{16} \\ * & \Phi_{22} & \Phi_{23} & 0 & 0 & 0 \\ * & * & -\gamma^2 I & 0 & 0 & 0 \\ * & * & * & -I & 0 & 0 \\ * & * & * & * & -I & 0 \\ * & * & * & * & * & -I \end{bmatrix} < 0, \begin{bmatrix} P_2 & S \\ S & S \end{bmatrix} > 0$$

wherein, $$\Phi_{11} = \begin{bmatrix} P_2 A + B_c C & A_c \\ SA + B_c C & A_c \end{bmatrix} + \begin{bmatrix} P_2 A + B_c C & A_c \\ SA + B_c C & A_c \end{bmatrix}^T,$$

$$\Phi_{12} = \begin{bmatrix} P_2 BV + (YCA)^T \\ SBV \end{bmatrix}, \Phi_{13} = \begin{bmatrix} P_2 B \\ SB \end{bmatrix}, \Phi_{14} = \begin{bmatrix} C_1^T \\ 0 \end{bmatrix},$$

$$\Phi_{15} = \begin{bmatrix} P_2 & 0 \\ 0 & S \end{bmatrix}, \Phi_{16} = \begin{bmatrix} BD_c C & BC_c \\ BD_c C & BC_c \end{bmatrix},$$

$$\Phi_{22} = Q_1 W + YCBV + (Q_1 W + YCBV)^T, \Phi_{23} = (YCB + Q_1 H),$$

obtaining unknown parameters:

$$L = Q_1^{-1} Y, \begin{bmatrix} A_k & B_k \\ C_k & D_k \end{bmatrix} = \begin{bmatrix} S^{-1} & 0 \\ 0 & I \end{bmatrix} \begin{bmatrix} A_c & B_c \\ C_c & D_c \end{bmatrix}.$$

In certain aspects, the present invention relates to a spacecraft using the method as described above.

Another objective of the present invention is to provide a spacecraft with the refined attitude control for a flexible spacecraft, comprising a spacecraft shell, an external system module, a disturbance observation module, a dynamic output feedback module, a refined attitude control module, a central processing unit (CPU), a control unit, a spacecraft flexible wing plate and a flexible spacecraft dynamical module, wherein the external system module is used to describe the rigid-flexible coupling dynamic disturbance, and delivers the description result of the rigid-flexible coupling dynamic disturbance to the refined attitude control module;

the disturbance observation module is used to estimate the value of the rigid-flexible coupling dynamic disturbance by a disturbance observer;

the dynamic output feedback module is used to suppress the environmental disturbance by a dynamic output feedback $H_\infty$ controller;

the refined attitude control module is combined by the disturbance observation module and the dynamic output feedback module, and is used to compensate for the rigid-flexible coupling dynamic disturbance of the spacecraft with the estimated value of the rigid-flexible coupling dynamic disturbance of the spacecraft;

the flexible spacecraft dynamical module is used to incorporate the spacecraft rigid-flexible coupling disturbance into a flexible spacecraft dynamical system;

the central processing unit (CPU) reads the data of the refined attitude control module and processes the data;

the control unit compensates for the rigid-flexible coupling dynamic disturbance of the spacecraft through the refined attitude control module, and adjusts the attitude of the spacecraft; and the spacecraft flexible wing plate is unfolded at two ends of the spacecraft shell.

The present invention provides a method for refined attitude control based on output feedback for a flexible spacecraft. A disturbance model is set up with respect to rigid-flexible coupling dynamics, and disturbance information is fully used. The configuration of the controller and disturbance observer is implemented using output feedback, which has more engineering value compared with the control methods based on state feedback.

It should be noted that the previous general description and the following specific description are both for illustration and explanation, and are not intended to limit the protection scope of the present invention.

BRIEF DESCRIPTION OF THE DRAWINGS

Further objectives, effects, and advantages of the present invention will become apparent from the following description of the embodiments of the present invention with reference to the accompanying drawings, wherein.

DETAILED DESCRIPTION OF THE INVENTION

Objects and functions of the present invention as well as methods for realizing these objects and functions will be elucidated with reference to exemplary embodiments. However, the present invention is not limited to the following disclosed exemplary embodiments, but may be implemented in different ways. The description of the invention is merely provided to assist those of ordinary skill in the art in a comprehensive understanding of specific details of the invention in nature.

As used herein, the term "module" may refer to, be part of, or include an Application Specific Integrated Circuit (ASIC); an electronic circuit; a combinational logic circuit; a field programmable gate array (FPGA); a processor (shared, dedicated, or group) that executes code; other suitable hardware components that provide the described functionality; or a combination of some or all of the above, such as in a system-on-chip. The term module may include memory (shared, dedicated, or group) that stores code executed by the processor.

Hereinafter, embodiments of the present invention will be described with reference to the drawings. In the drawings, like reference numerals designate like or similar parts or steps.

Figure 1:
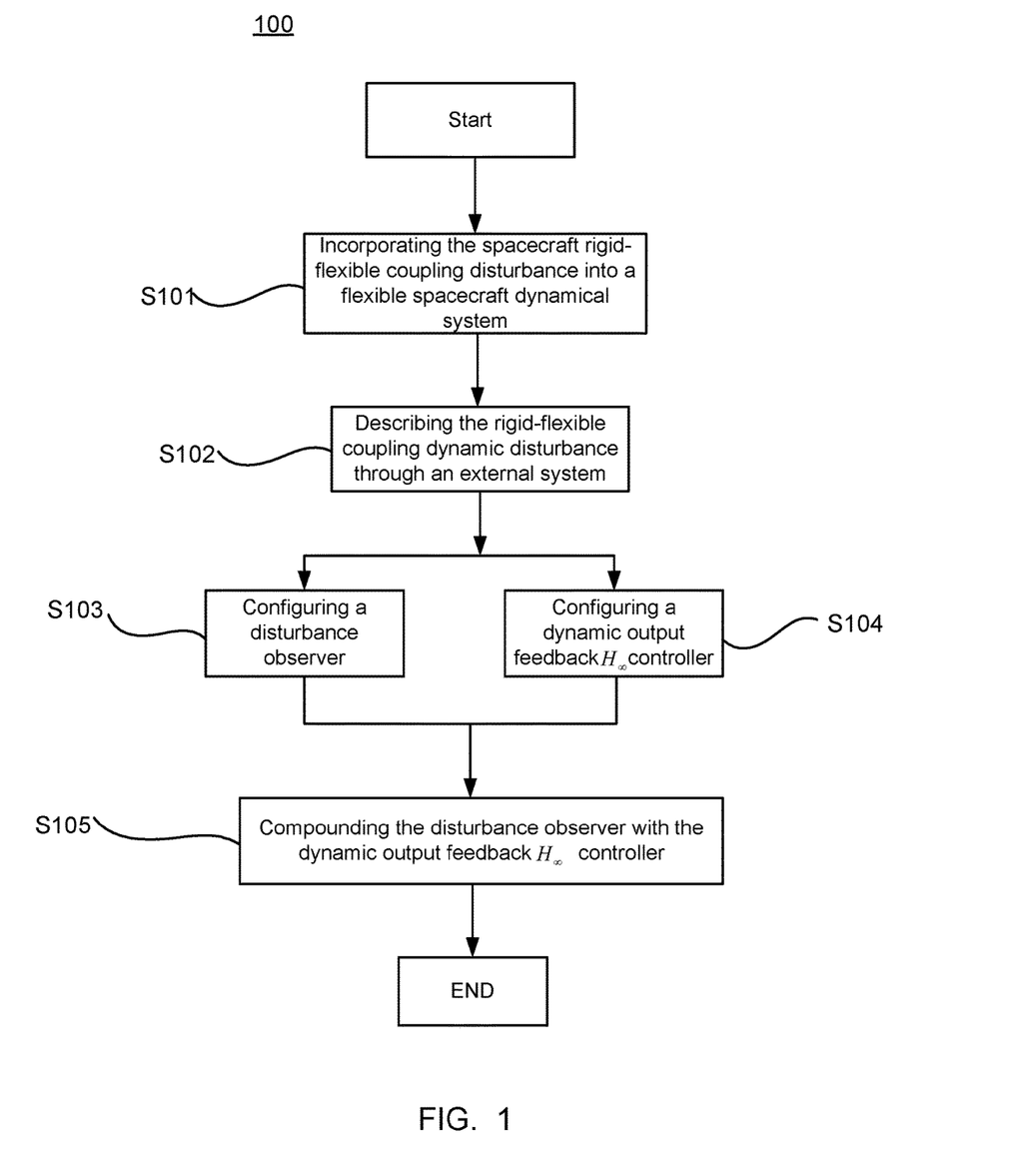
FIG. 1 illustrates a flow chart of the method for refined attitude control based on output feedback for a flexible spacecraft according to the present invention.

The present invention provides a method for refined attitude control based on output feedback for a flexible spacecraft. As shown in FIG. 1, according to the method 100 for refined attitude control for a flexible spacecraft in the embodiment, a spacecraft rigid-flexible coupling dynamic disturbance is incorporated into a flexible spacecraft dynamical system, and the spacecraft rigid-flexible coupling dynamic disturbance is described with the aid of an external system. A disturbance observer is configured for estimating the value of the rigid-flexible coupling dynamic disturbance, and a dynamic output feedback $H_\infty$ controller is configured for suppressing the environmental disturbance, and the disturbance observer is compounded with the dynamic output feedback $H_\infty$ controller for compensating for the rigid-flexible coupling dynamic disturbance through the estimated value of the rigid-flexible coupling dynamic disturbance.

Figure 2:
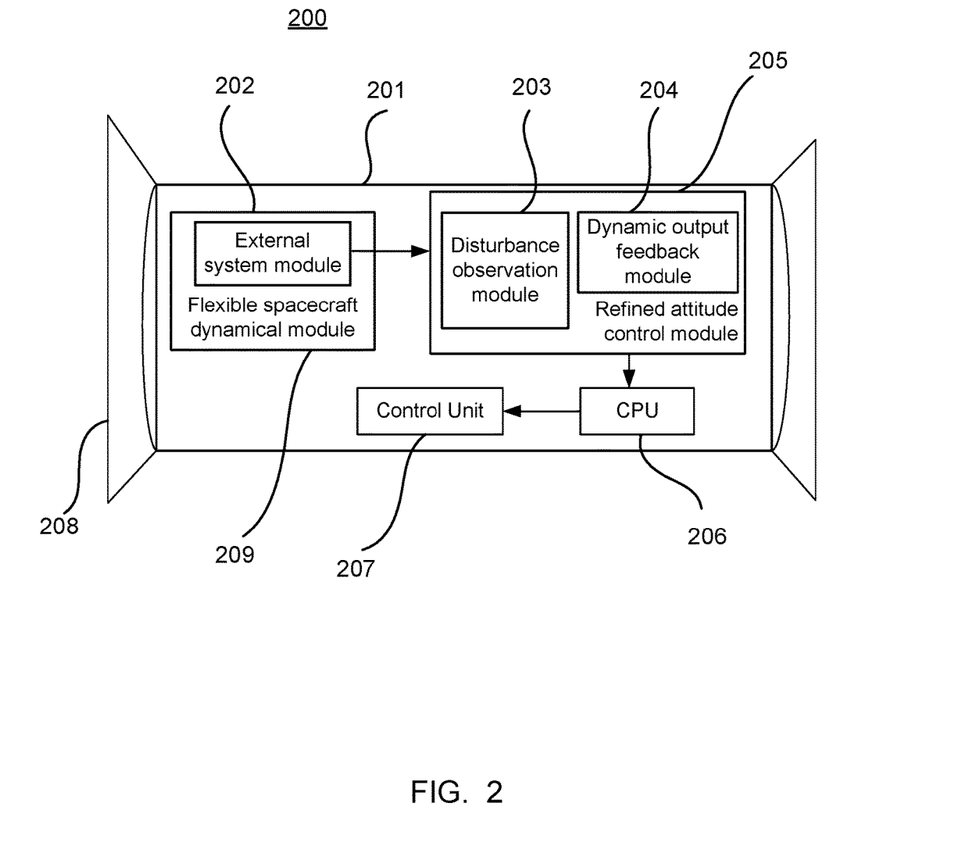
FIG. 2 shows a block diagram of a spacecraft with the refined attitude control based on output feedback for a flexible spacecraft according to an embodiment of the present invention.

With the purpose of illustration, the method for refined attitude control based on output feedback for a flexible spacecraft provided in the present invention is implemented by different modules. As shown in FIG. 2, it is a block diagram 200 of a spacecraft with the refined attitude control for a flexible spacecraft according to an embodiment of the present invention. Specifically, the spacecraft 200 comprises but not limited to a spacecraft shell 201, an external system module 202, a disturbance observation module 203, a dynamic output feedback module 204, a refined attitude control module 205, a central processing unit (CPU) 206, a control unit 207, a spacecraft flexible wing plate 208 and a flexible spacecraft dynamical module 209.

As shown in FIG. 2, the external system module 202, the disturbance observation module 203, the dynamic output feedback module 204, the refined attitude control module 205, the central processing unit (CPU) 206, the control unit 207 and the flexible spacecraft dynamical module 209 are mounted on the spacecraft shell 201. The spacecraft flexible wing plate 208 is unfolded at two ends of the spacecraft shell 201.

The external system module 202 is used to describe the rigid-flexible coupling dynamic disturbance. The external system module 202 delivers the description result of the rigid-flexible coupling dynamic disturbance to the refined attitude control module 205.

The disturbance observation module 203 is used to estimate the value of the rigid-flexible coupling dynamic disturbance by a disturbance observer.

The dynamic output feedback module 204 is used to suppress the environmental disturbance by a dynamic output feedback $H_\infty$ controller.

The refined attitude control module 205 is combined by the disturbance observation module 203 and the dynamic output feedback module 204. The refined attitude control module 205 is used to compensate for the rigid-flexible coupling dynamic disturbance of the spacecraft with the estimated value of the rigid-flexible coupling dynamic disturbance of the spacecraft.

The flexible spacecraft dynamical module 209 is used to incorporate the spacecraft rigid-flexible coupling disturbance into a flexible spacecraft dynamical system.

The central processing unit (CPU) 206 reads the data of the refined attitude control module 205 and processes the data.

The control unit 207 executes the processing result of the central processing unit (CPU) 206 and performs refined control for the attitude of the spacecraft. Specifically, the control unit 207 compensates for the rigid-flexible coupling dynamic disturbance of the spacecraft through the refined attitude control module 205, thereby adjusting the attitude of the spacecraft.

The spacecraft attitude control method according to this embodiment will be described in detail below with reference to FIG. 1.

In step S101: incorporating spacecraft rigid-flexible coupling disturbance into a flexible spacecraft dynamical system, and incorporating rigid-flexible coupling dynamic disturbance.

A flexible spacecraft dynamical system $\Sigma_1$ is built and the system $\Sigma_1$ is expressed as:

$$\Sigma_1 : \begin{cases} J\ddot{\theta} + F\ddot{\eta} = u + d_1 \\ \ddot{\eta} + C_d \dot{\eta} + \Lambda\eta + F^T\ddot{\theta} = 0 \end{cases}$$

wherein, $\theta$ is a spacecraft attitude angle, $\ddot{\theta}$ is a second-order derivative of the spacecraft attitude angle $\theta$, J is a spacecraft rotational inertia, F is the rigid-flexible coupling matrix of the flexible appendage and the body, $F^T$ is a transposed matrix of the rigid-flexible coupling matrix, u is control input, $d_1$ is environmental disturbance torque, $\eta$ is the mode of the flexible appendage, $\dot{\eta}$ is the derivative of the mode $\eta$ of the flexible appendage, $\ddot{\eta}$ is a second-order derivative of the mode $\eta$ of the flexible appendage, $C_d$ is the modal damping matrix, and $\Lambda$ is the rigidity matrix. The modal damping matrix $C_d$ is expressed as $C_d=\text{diag}\{2\zeta_i\omega_i\}$ (i=1, 2, ... N), in which N is a number of orders of the mode, $\zeta_i$ is modal damping, $\omega_i$ is a modal frequency; the rigidity matrix $\Lambda$ is expressed as $\Lambda=\text{diag}\{\omega_i^2\}$ (i=1, 2, ... N).

The flexible spacecraft dynamical system $\Sigma_1$ is converted into a system $\Sigma_2$, which is expressed as: $\Sigma_2$: $(J-FF^T)\ddot{\theta}=F(C_d\dot{\eta}+\Lambda\eta)+u+d_1$, and in the system $\Sigma_2$, $F(C_d\dot{\eta}+\Lambda\eta)$ is flexible spacecraft rigid-flexible coupling dynamic disturbance.

In step S102, describing the rigid-flexible coupling dynamic disturbance through an external system $\Sigma_3$.

Make $d_0=F(C_d\dot{\eta}+\Lambda\eta)$, $d_0$ indicates the rigid-flexible coupling dynamic disturbance, and the rigid-flexible coupling dynamic disturbance $d_0$ is described using the external system $\Sigma_3$:

$$\Sigma_3 : \begin{cases} \dot{w} = Ww + H(u+d_1) \\ d_0 = Vw \end{cases}$$

in which, $w = [\eta^T \dot{\eta}^T]^T$, $W = \begin{bmatrix} 0 & I \\ -M^{-1}\Lambda & -M^{-1}C_d \end{bmatrix}$, $H = \begin{bmatrix} 0 \\ -\frac{1}{J}M^{-1}F^T \end{bmatrix}$, $V = [F\Lambda \quad FC_d]$ w is a disturbance state variable of the external system $\Sigma_3$, $\dot{w}$ is a derivative of w, W, H and V are defined coefficient matrixes, and in the matrix W, the matrix M is expressed as $M=I-F^T J^{-1} F$, and I is a unit matrix.

In step S103, configuring a disturbance observer for estimating the value of the incorporated rigid-flexible coupling dynamic disturbance.

The rigid-flexible coupling dynamic disturbance is incorporated into the spacecraft dynamical system in step S101, and it needs to estimate the value of the rigid-flexible coupling dynamic disturbance. The disturbance observer is used to estimate the value of the rigid-flexible coupling dynamic disturbance. The configuration of the disturbance observer will be described below in detail.

The disturbance observer is specifically configured in the following steps:

(1) constructing a spacecraft attitude angle input matrix $$x = [\theta \quad \dot{\theta}]^T;$$

(2) converting the system $\Sigma_2$ into a state space system $\Sigma_4$, which is expressed as:

$$\Sigma_4 : \begin{cases} \dot{x} = Ax + B(u + d_0 + d_1) \\ y = Cx \end{cases}$$

wherein, $$A = \begin{bmatrix} 0 & 1 \\ 0 & 0 \end{bmatrix}, B = \begin{bmatrix} 0 \\ (J-FF^T)^{-1} \end{bmatrix},$$

A and B are coefficient matrixes, y is a measurement output, and C is a measurement matrix;

(3) configuring the disturbance observer with the aid of the measurement output y, and the disturbance observer is specifically expressed through the following formula:

$$\begin{cases} \hat{d}_0 = V\hat{w} \\ \hat{w} = v - Ly \\ \dot{v} = (W + LVBV)\hat{w} + (H + LCB)u \end{cases} \quad (1)$$

wherein, $\hat{d}_0$ is an estimated value of the rigid-flexible coupling dynamic disturbance $d_0$, v is an auxiliary variable, $\dot{v}$ is a derivative of the auxiliary variable v, y is the measurement output, and L is a disturbance observer gain matrix; observation error dynamic $\Sigma_5$ of the disturbance controller is expressed as:

$$\Sigma_5 : \dot{e}_w = (W+LCBV)e_w + LVAx + (LVB+H)d_1$$

wherein, $e_w = w - \hat{w}$, $\hat{w}$ is an estimated value of the disturbance state variable w, and $\dot{e}_w$ is a derivative of $e_w$. The disturbance observer configured through the formula (1) estimates the value of $\hat{d}_0$ of the rigid-flexible coupling dynamic disturbance $d_0$.

In step S104, configuring a dynamic output feedback $H_\infty$ controller for suppressing the environmental disturbance.

The dynamic output feedback $H_\infty$ controller is specifically expressed though the following formula:

$$\begin{cases} \dot{x}_k = A_k x_k + B_k y \\ u_1 = C_k x_k + D_k y \end{cases} \quad (2)$$

wherein, $u_1$ is input of the dynamic output feedback $H_\infty$ controller, $x_k$ is a controller state, $A_x$, $B_x$, $C_x$ and $D_x$ are controller parameter matrixes to be determined, and the dynamic output feedback $H_\infty$ controller suppresses environmental disturbance.

In step S105, compounding the disturbance observer with the dynamic output feedback $H_\infty$ controller to compensate the estimated value of the rigid-flexible coupling dynamic disturbance.

In order to clearly describe the refined attitude control of the spacecraft, it needs to compensate for the rigid-flexible coupling dynamic disturbance incorporated into the spacecraft dynamical system with the estimated value. In the present invention, a refined attitude control system is used to compound the disturbance observer with the dynamic output feedback $H_\infty$ controller to compensate the estimated value of the rigid-flexible coupling dynamic disturbance.

In this embodiment, in particular, the expression (1) of the disturbance observer is compounded with the expression (1) of the dynamic output feedback $H_\infty$ controller to obtain a flexible spacecraft refined attitude control system $\Sigma_6$ which is specifically expressed as:

$$\Sigma_6: \begin{cases} \dot{x}_k = A_k x_k + B_k y \\ u = C_k x_k + D_k y - \hat{d}_0 \end{cases}$$

in which, u is the control input, and $\hat{d}_0$ is the value of the rigid-flexible coupling dynamic disturbance $d_0$ estimated by the disturbance observer.

In the above flexible spacecraft refined attitude control system $\Sigma_6$ the control input u is subtracted by the estimated value $\hat{d}_0$ of the rigid-flexible coupling dynamic disturbance $d_0$ on the basis of input $u_1$ of the dynamic output feedback $H_\infty$ controller. When the value $\hat{d}_0$ estimated by the disturbance observer is approximate to the rigid-flexible coupling dynamic disturbance $d_0$, i.e., $\hat{d}_0 \approx d_0$, the flexible spacecraft refined attitude control system $\Sigma_6$ realizes the compensation for the rigid-flexible coupling dynamic disturbance $d_0$ through the estimated value $\hat{d}_0$ of the rigid-flexible coupling dynamic disturbance.

The disturbance controller gain matrix L and the controller parameter matrixes $A_x$, $B_x$, $C_x$, $D_x$ to be determined are solved through a convex optimization algorithm as below:

making the systems $\Sigma_4$, $\Sigma_5$ and $\Sigma_6$ simultaneous, and obtaining:

$$\begin{bmatrix} \dot{x} \\ \dot{x}_k \\ \dot{e}_w \end{bmatrix} = \begin{bmatrix} A + BD_k C & BC_k & BV \\ B_k C & A_k & 0 \\ LCA & 0 & W + LCBV \end{bmatrix} \begin{bmatrix} x \\ x_k \\ e_w \end{bmatrix} + \begin{bmatrix} B \\ 0 \\ LCB + H \end{bmatrix} d_1$$

solving the following convex optimization problem:

$$\begin{bmatrix} \Phi_{11} & \Phi_{12} & \Phi_{13} & \Phi_{14} & \Phi_{15} & \Phi_{16} \\ * & \Phi_{22} & \Phi_{23} & 0 & 0 & 0 \\ * & * & -\gamma^2 I & 0 & 0 & 0 \\ * & * & * & -I & 0 & 0 \\ * & * & * & * & -I & 0 \\ * & * & * & * & * & -I \end{bmatrix} < 0, \begin{bmatrix} P_2 & S \\ S & S \end{bmatrix} > 0$$

wherein, $$\Phi_{11} = \begin{bmatrix} P_2 A + B_c C & A_c \\ SA + B_c C & A_c \end{bmatrix} + \begin{bmatrix} P_2 A + B_c C & A_c \\ SA + B_c C & A_c \end{bmatrix}^T,$$

$$\Phi_{12} = \begin{bmatrix} P_2 BV + (YCA)^T \\ SBV \end{bmatrix}, \Phi_{13} = \begin{bmatrix} P_2 B \\ SB \end{bmatrix}, \Phi_{14} = \begin{bmatrix} C_1^T \\ 0 \end{bmatrix},$$

$$\Phi_{15} = \begin{bmatrix} P_2 & 0 \\ 0 & S \end{bmatrix}, \Phi_{16} = \begin{bmatrix} BD_c C & BC_c \\ BD_c C & BC_c \end{bmatrix},$$

$$\Phi_{22} = Q_1 W + YCBV + (Q_1 W + YCBV)^T, \Phi_{23} = (YCB + Q_1 H),$$

obtaining unknown parameters:

$$L = Q_1^{-1} Y, \begin{bmatrix} A_k & B_k \\ C_k & D_k \end{bmatrix} = \begin{bmatrix} S^{-1} & 0 \\ 0 & I \end{bmatrix} \begin{bmatrix} A_c & B_c \\ C_c & D_c \end{bmatrix}.$$

Using the method for refined attitude control based on output feedback for a flexible spacecraft according to the present invention, a disturbance model is set up with respect to rigid-flexible coupling dynamics, and disturbance information is fully used. The configuration of the controller and disturbance observer is implemented using output feedback, which has more engineering value compared with the control methods based on state feedback.

In certain aspects, the present invention relates to a spacecraft using the method as described above.

Other examples of the present invention are obvious and easy to conceive for a person skilled in the art by combining the description disclosed herein and practice. The description and examples are only for illustration, and the real scope and essence of the present invention will be defined by the claims.

Based on the description and practice of the present invention as disclosed herein, other embodiments of the present invention are readily conceived of and understood to those skilled in the art. The description and embodiments are provided for exemplary purpose only, the real scope and spirit of the present invention are defined by the claims.

Other embodiments will be conceivable and understood by those skilled in the art upon consideration of this description or from practice of the invention disclosed herein. The description and embodiments are merely exemplary, and the true scope and spirit are intended to be defined by the claims.

What is claimed is:

1. A method for refined attitude control based on output feedback for a flexible spacecraft, comprising the following steps of:
   a) building a flexible spacecraft dynamical system $\Sigma_1$, converting the flexible spacecraft dynamical system $\Sigma_1$ into a flexible spacecraft dynamical system $\Sigma_2$, and incorporating spacecraft rigid-flexible coupling dynamic disturbance into the flexible spacecraft dynamical system $\Sigma_2$;
   b) constructing an external system $\Sigma_3$, and describing the rigid-flexible coupling dynamic disturbance through the external system $\Sigma_3$; the rigid-flexible coupling dynamic disturbance $d_0$ is expressed as $d_0=F(C_d\dot{\eta}+\Lambda\eta)$, in which F is a rigid-flexible coupling matrix of a flexible appendage and a body, $C_d$ is a modal damping matrix, $\Lambda$ is a rigidity matrix, $\eta$ is a mode of the flexible appendage, and $\dot{\eta}$ is a derivative of the mode $\eta$ of the flexible appendage;

the external system $\Sigma_3$ describing the rigid-flexible coupling dynamic disturbance $d_0$ as:

$$\Sigma_3: \begin{cases} \dot{w} = Ww + H(u+d_1) \\ d_0 = Vw \end{cases}$$

in which, $w[\eta^T \quad \dot{\eta}^T]^T$, $W = \begin{bmatrix} 0 & I \\ -M^{-1}\Lambda & -M^{-1}C_d \end{bmatrix}$, $H = \begin{bmatrix} 0 \\ -\frac{1}{J}M^{-1}F^T \end{bmatrix}$, $V = [F\Lambda \quad FC_d]$ w is a disturbance state variable of the external system $\Sigma_3$, $\dot{w}$ is a derivative of w, W, H and V are defined coefficient matrixes, and I is a unit matrix;

c) configuring a disturbance observer for estimating a value of the rigid-flexible coupling dynamic disturbance, comprising;
  (1) constructing a spacecraft attitude angle input matrix $$x = [\theta \quad \dot{\theta}]^T;$$

(2) converting the system $\Sigma_2$ into a state space system $\Sigma_4$, which is expressed as:

$$\Sigma_4: \begin{cases} \dot{x} = Ax + B(u+d_0+d_1) \\ y = Cx \end{cases}$$

wherein, $A = \begin{bmatrix} 0 & 1 \\ 0 & 0 \end{bmatrix}$, $B = \begin{bmatrix} 0 \\ (J-FF^T)^{-1} \end{bmatrix}$, A and B are coefficient matrixes, y is a measurement output, and C is a measurement matrix;
  (3) configuring the disturbance observer with the aid of the measurement output y, the disturbance observer being expressed as:

$$\begin{cases} \hat{d}_0 = V\hat{w} \\ \hat{w} = v - Ly \\ \dot{v} = (W+LVBV)\hat{w} + (H+LCB)u \end{cases}$$

wherein, $\hat{d}_0$ is an estimated value of the rigid-flexible coupling dynamic disturbance $d_0$, v is an auxiliary variable, $\hat{v}$ is a derivative of the auxiliary variable v, y is the measurement output, and L is a disturbance observer gain matrix;

observation error dynamic $\Sigma_5$ of the disturbance controller is expressed as:

$\Sigma_5: \dot{e}_w = (W+LCBV)e_w + LVAx + (LVB+H)d_1$ wherein, $e_w = w - \hat{w}$, $\hat{w}$ is an estimated value of the disturbance state variable w and $\dot{e}_w$ is a derivative of $e_w$;

d) configuring a dynamic output feedback $H_\infty$ controller; wherein the dynamic output feedback $H_\infty$ controller in the step d) is expressed as:

$$\begin{cases} \dot{x}_k = A_k x_k + B_k y \\ u_1 = C_k x_k + D_k y \end{cases}$$

wherein, $u_1$ is input of the dynamic output feedback $H_\infty$ controller, $x_k$ is a controller state, $A_x, B_x, C_x$ and $D_x$ are controller parameter matrixes to be determined, and the dynamic output feedback $H_\infty$ controller suppresses environmental disturbance;

e) compounding the disturbance observer in step c) with the dynamic output feedback $H_\infty$ controller in step d) to obtain a flexible spacecraft refined attitude control system $\Sigma_6$, wherein $\Sigma_6$ is expressed as:

$$\Sigma_6: \begin{cases} \dot{x}_k = A_k x_k + B_k y \\ u = C_k x_k + D_k y - \hat{d}_0 \end{cases}$$

wherein u is the control input, and $\hat{d}_0$ is the value of the rigid-flexible coupling dynamic disturbance $d_0$ estimated by the disturbance observer, and the flexible spacecraft refined attitude control system $\Sigma_6$ is used to compensate for the rigid-flexible coupling dynamic disturbance through the estimated value.

2. The method according to claim 1, wherein the flexible spacecraft dynamical system $\Sigma_1$ is expressed as:

$$\Sigma_1: \begin{cases} J\ddot{\theta} + F\ddot{\eta} = u + d_1 \\ \ddot{\eta} + C_d\dot{\eta} + \Lambda\eta + F^T\ddot{\theta} = 0 \end{cases}$$

wherein, $\theta$ is a spacecraft attitude angle, $\ddot{\theta}$ is a second-order derivative of the spacecraft attitude angle $\theta$, J is a spacecraft rotational inertia, F is the rigid-flexible coupling matrix of the flexible appendage and the body, $F^T$ is a transposed matrix of the rigid-flexible coupling matrix, u is control input, $d_1$ is environmental disturbance torque, $\eta$ is the mode of the flexible appendage, $\dot{\eta}$ is the derivative of the mode $\eta$ of the flexible appendage, $\ddot{\eta}$ is a second-order derivative of the mode $\eta$ of the flexible appendage, $C_d$ is the modal damping matrix, and $\Lambda$ is the rigidity matrix.

3. The method according to claim 2, wherein the modal damping matrix $C_d$ is expressed as $C_d=\text{diag}\{2\zeta_i\omega_i\}$ (i=1, 2, ... N), in which N is a number of orders of the mode, $\zeta_i$ is modal damping, $\omega_i$ is a modal frequency, and the rigidity matrix $\Lambda$ is expressed as $\Lambda=\text{diag}\{\omega_i^2\}$ (i=1, 2, ... N).

4. The method according to claim 1, wherein the system $\Sigma_2$ is expressed as:

$\Sigma_2: (J-FF^T)\ddot{\theta}=F(C_d\dot{\eta}+\Lambda\eta)+u+d_1$ wherein, $\ddot{\theta}$ is the second-order derivative of the spacecraft attitude angle $\theta$, J is the spacecraft rotational inertia, F is the rigid-flexible coupling matrix of the flexible appendage and the body, $F^T$ is the transposed matrix of the rigid-flexible coupling matrix, u is the control input, $d_1$ is the environmental disturbance torque, $\eta$ is the mode of the flexible appendage, $\dot{\eta}$ is the derivative of the mode η of the flexible appendage, $C_d$ is the modal damping matrix, and $\Lambda$ is the rigidity matrix.

5. The method according to claim 1, wherein in the coefficient matrix W, the matrix M is expressed as $M=I-F^T J^{-1} F$, in which I is the unit matrix.

6. The method according to claim 1, wherein the disturbance controller gain matrix L and the controller parameter matrixes $A_x$, $B_x$, $C_x$, $D_x$ to be determined are solved through a convex optimization algorithm as below:

making the systems $\Sigma_4$, $\Sigma_5$ and $\Sigma_6$ simultaneous, and obtaining:

$$\begin{bmatrix} \dot{x} \\ \dot{x}_k \\ \dot{e}_w \end{bmatrix} = \begin{bmatrix} A+BD_kC & BC_k & BV \\ B_kC & A_k & 0 \\ LCA & 0 & W+LCBV \end{bmatrix} \begin{bmatrix} x \\ x_k \\ e_w \end{bmatrix} + \begin{bmatrix} B \\ 0 \\ LCB+H \end{bmatrix} d_1$$

solving the following convex optimization problem:

$$\begin{bmatrix} \Phi_{11} & \Phi_{12} & \Phi_{13} & \Phi_{14} & \Phi_{15} & \Phi_{16} \\ * & \Phi_{22} & \Phi_{23} & 0 & 0 & 0 \\ * & * & -\gamma^2 I & 0 & 0 & 0 \\ * & * & * & -I & 0 & 0 \\ * & * & * & * & -I & 0 \\ * & * & * & * & * & -I \end{bmatrix} < 0 \begin{bmatrix} P_2 & S \\ S & S \end{bmatrix} > 0$$

wherein, $$\Phi_{11} = \begin{bmatrix} P_2A+B_cC & A_c \\ SA+B_cC & A_c \end{bmatrix} + \begin{bmatrix} P_2A+B_cC & A_c \\ SA+B_cC & A_c \end{bmatrix}^T,$$

$$\Phi_{12} = \begin{bmatrix} P_2BV+(YCA)^T \\ SBV \end{bmatrix}, \Phi_{13} = \begin{bmatrix} P_2B \\ SB \end{bmatrix}, \Phi_{14} = \begin{bmatrix} C_1^T \\ 0 \end{bmatrix},$$

$$\Phi_{15} = \begin{bmatrix} P_2 & 0 \\ 0 & S \end{bmatrix}, \Phi_{16} = \begin{bmatrix} BD_cC & BC_c \\ BD_cC & BC_c \end{bmatrix},$$

$\Phi_{22} = Q_1W + YCBV + (Q_1W+YCBV)^T$, $\Phi_{23} = (YCB+Q_1H)$, obtaining unknown parameters:

$$L = Q_1^{-1}Y, \begin{bmatrix} A_k & B_k \\ C_k & D_k \end{bmatrix} = \begin{bmatrix} S^{-1} & 0 \\ 0 & I \end{bmatrix} \begin{bmatrix} A_c & B_c \\ C_c & D_c \end{bmatrix}.$$

7. A spacecraft using the method of claim 1.

8. A spacecraft with the refined attitude control for a flexible spacecraft, comprising a spacecraft shell, an external system module, a disturbance observation module, a dynamic output feedback module, a refined attitude control module, a central processing unit (CPU), a control unit, a spacecraft flexible wing plate and a flexible spacecraft dynamical module, wherein the external system module is used to describe the rigid-flexible coupling dynamic disturbance, and delivers the description result of the rigid-flexible coupling dynamic disturbance to the refined attitude control module;

the disturbance observation module is used to estimate the value of the rigid-flexible coupling dynamic disturbance by a disturbance observer;

the dynamic output feedback module is used to suppress the environmental disturbance by a dynamic output feedback $H_\infty$ controller;

the refined attitude control module is combined by the disturbance observation module and the dynamic output feedback module, and is used to compensate for the rigid-flexible coupling dynamic disturbance of the spacecraft with the estimated value of the rigid-flexible coupling dynamic disturbance of the spacecraft;

the flexible spacecraft dynamical module is used to incorporate the spacecraft rigid-flexible coupling disturbance into a flexible spacecraft dynamical system;

the central processing unit (CPU) reads the data of the refined attitude control module and processes the data;

the control unit compensates for the rigid-flexible coupling dynamic disturbance of the spacecraft through the refined attitude control module, and adjusts the attitude of the spacecraft; and the spacecraft flexible wing plate is unfolded at two ends of the spacecraft shell.

* * * * *